UNITED STATES PATENT OFFICE.

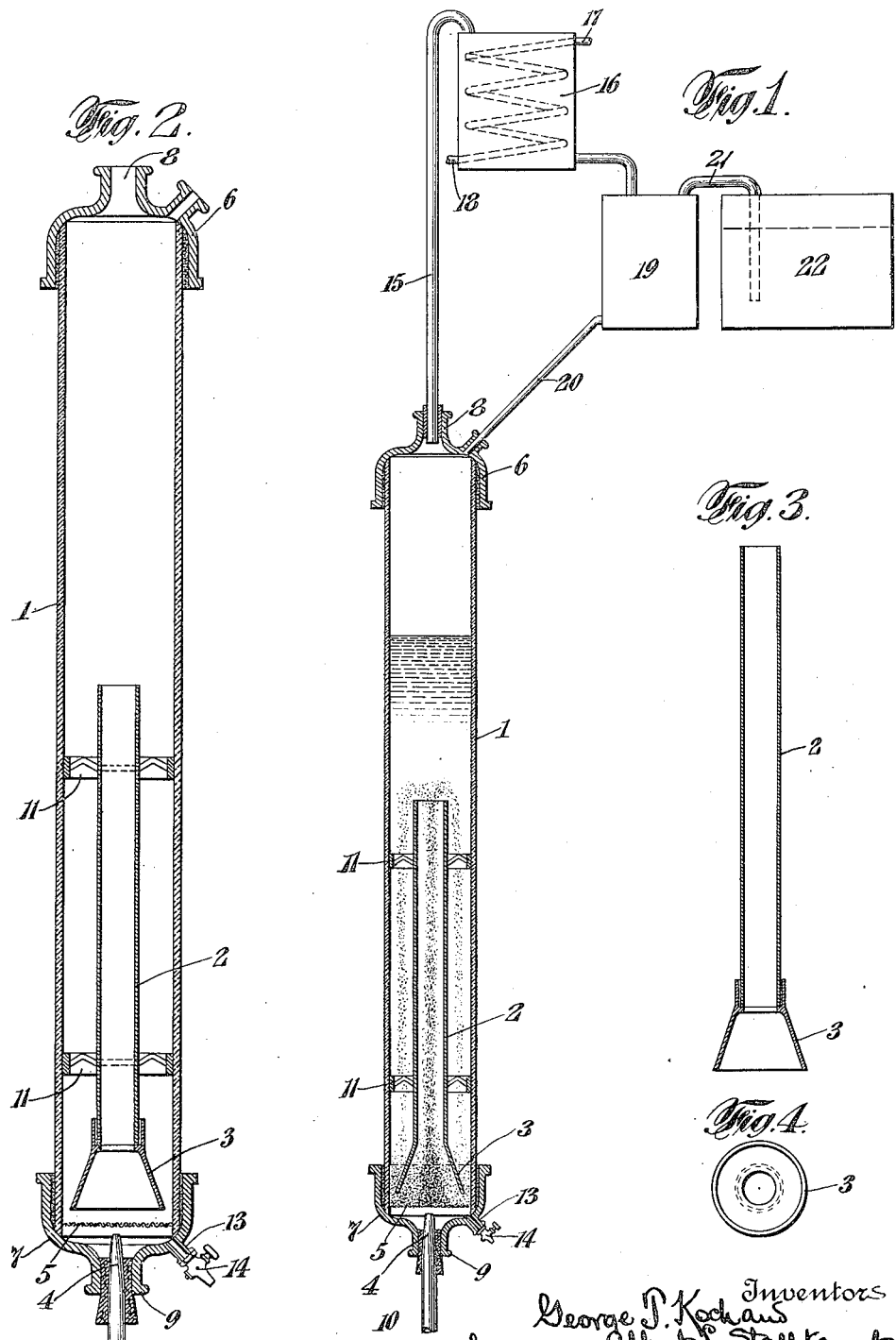

GEORGE T. KOCH AND ALBERT L. STALLKAMP, OF HOMER, OHIO, ASSIGNORS TO THE OHIO FUEL SUPPLY COMPANY, OF PITTSBURGH, PENNSYLVANIA, A CORPORATION OF OHIO.

METHOD OF CHLORINATING HYDROCARBONS.

1,380,067. Specification of Letters Patent. Patented May 31, 1921.

Application filed December 6, 1919. Serial No. 343,050.

*To all whom it may concern:*

Be it known that we, GEORGE T. KOCH and ALBERT L. STALLKAMP, citizens of the United States, residing at Homer, in the county of Licking and State of Ohio, have invented certain new and useful Improvements in Methods of Chlorinating Hydrocarbons; and we do hereby declare the following to be a full, clear, and exact description of the invention, such as will enable others skilled in the art to which it appertains to make and use the same.

This invention consists in the novel features hereinafter described reference being had to the accompanying drawings, which illustrate one form of apparatus which may be conveniently employed for carrying the invention into effect, and said invention is fully disclosed in the following description and claims.

This invention relates to the manufacture of chlorinated derivatives of the hydrocarbons of the series $C_nH_{2n+2}$, or in other words, the paraffin series of hydrocarbons, by treating such hydrocarbons with chlorin. A particularly valuable application of this invention is the treatment with chlorin of the liquid members of the said paraffin series, with the production of mixtures of chlorinated derivatives therefrom, the chlorination being carried on in the liquid phase. Many attempts have been made to chlorinate these hydrocarbons, but it has been found that the reaction proceeds more or less irregularly and violently, and results in products varying in character and amount.

The present invention is based upon the discovery that by treating members of the paraffin series, particularly paraffin hydrocarbons in liquid form, with chlorin, in the presence of an adsorbent as a catalyzer or chlorin carrier, the reaction can be made to proceed more smoothly and more quickly than otherwise, with the resulting production of products more definite in character and amount. The substances which we preferably employ as the adsorbent catalyzer or chlorin carrier are any one of the following, which have been found to produce efficiently the results stated, to wit:—silica jel, batchite, or cocoanut charcoal (dorsite).

Silica jel is a hard transparent, porous substance of high luster, being the product obtained when water glass of definite specific gravity is treated with a hydrochloric acid of given strength.

Batchite is anthracite or bituminous coal which has been activated by treatment with superheated steam to remove the absorbed hydrocarbons.

Cocoanut charcoal (dorsite) is carbonized cocoanut hulls which have been activated by prolonged treatment with superheated steam.

In carrying out our invention we have further found that if the absorbent or catalyzer, such as silica jel, batchite, or cocoanut charcoal, is impregnated with salts of metals, it tends to increase their activity, and further the progress of the reaction, and we therefore prefer in some instances to so impregnate the catalyzer before using it. We have also found that the efficiency of the adsorbent, such as silica jel, batchite, or cocoanut charcoal, is increased after repeated usage. This is especially the case with silica jel and batchite, but is true of all the materials mentioned. In carrying the invention into effect, the liquid paraffin hydrocarbon to be treated is confined in a suitable container in the bottom of which an adsorbent, preferably silica jel, batchite, or cocoanut charcoal, in finely divided condition, is provided, and the chlorin gas is preferably admitted into the hydrocarbon liquid of the paraffin series in the presence of said catalyzing material in such manner as to agitate or carry up the catalyzing material preferably through a comparatively small portion of the hydrocarbon liquid, by the influx of the chlorin gas, thus bringing the chlorin gas, the catalyzing material, and the hydrocarbon liquid into intimate relation, the catalyzing material returning to the bottom of the container and being used over and over again, whereby large amounts of chlorin are absorbed by the catalyzing material, and enters into reaction with the hydrocarbon liquid with the production of the chlorinated derivatives therefrom.

In the accompanying drawing,

Figure 1 illustrates one form of apparatus which has been found advantageous in carrying the invention into effect.

Fig. 2 is an enlarged detailed sectional view of the container which is preferably employed in carrying out the invention, showing an internal tubular member, providing a tubular passage for bringing the catalyzing material into intimate relation with a portion of the contained hydrocarbon liquid under treatment.

Fig. 3 is an enlarged detail view of the said internal tubular member located within the container.

Fig. 4 is a bottom plan view of the same, illustrating the flaring portion thereof.

Referring to the accompanying drawing, 1 represents the reaction chamber which preferably consists of a vertically disposed tubular container of glass of suitable length and diameter, and made of a quality of glass which permits the free passage of actinic rays. The ends of the vessel are closed, being preferably set in heads 6—7 or reducers made of acid resisting material, and provided with reduced openings 8—9 respectively, said heads being conveniently secured to the glass container 1 so as to be liquid tight, as by means of a cement composed of lead oxid and glycerin, for example. The aperture 9 in the lower head is provided with a small nozzle or jet 4 connected with a suitable pipe 10, by means of which the chlorin is introduced into the container. 2 represents a vertically disposed cylindrical member of smaller diameter than the container, supported by suitable spiders or brackets 11, so as to be disposed substantially central within the container, and provided at its lower end with a downwardly and outwardly flaring mouth portion, or enlargement 3, adjacent to the jet or nozzle 4. This centrally disposed vertical tubular member we term the percolator, and it serves the function of bringing the adsorbent or catalyzing material into intimate relation with a small quantity of the hydrocarbon liquid treated. Below the flaring mouth or enlargement 3 of the percolator, a wire screen 5 is provided to support the catalyzing material, and prevent it from passing out of the apparatus or into the chlorin jet or nozzle 4. The lower head is conveniently provided with a draw-off pipe or passage 13, provided with a cock 14, which pipe and cock are of acid resisting material and communicate with the container below the screen 5 for the purpose of drawing off the hydrocarbon liquid after treatment. The aperture 8 at the upper end of the container is preferably connected by a pipe 15 with a condenser 16, which is represented diagrammatically in the drawing, and may for example, be provided with pipes 17—18 for the passage therethrough of a cooling medium, the condenser discharging into a reservoir 19 from which any condensed liquid is transferred back to the container 1 by a pipe 20, while any gas escaping, which will be hydrogen chlorid, is carried to an absorber 22 by a pipe 21 where it is brought into contact with water forming a solution of hydro-chloric acid.

In carrying the invention into effect, the catalyzing material, which may be silica jel, batchite, or cocoanut charcoal for example, and which may or may not have been previously impregnated with salts of metals, is placed in the container above the screen 5, to a proper depth, as for example, four to six inches, the catalyzing material, being in finely divided condition, as for example, from eight to twenty mesh, or in other words, of sufficiently small size to allow the chlorin gas to pass freely through it, the particles of the catalyzer being light enough to be carried through the percolator and through the hydrocarbon liquid by the influx of the chlorin gas. The liquid hydrocarbon to be treated, or mixture of liquid hydrocarbons of the paraffin series, is then run into the container until the latter is about three quarters full. Chlorin gas is then admitted into the container 1 through the small jet or nozzle 4, which is placed concentrically with respect to the funnel shaped mouth or enlargement 3 of the percolator and the gas passes through the catalyzing material and up through the percolator 2—3, carrying portions of the catalyzing material up through the liquid within the percolator. While flowing up through the percolator the catalyzing material and chlorin are in intimate contact in the presence of a small quantity of the liquid, and large amounts of the chlorin are absorbed by the catalyzing material. Upon spouting from the top of the percolator, the catalyzing material enters what is termed the reaction zone where it comes in contact with a larger quantity of the liquid, dropping its absorbed chlorin, which enters into reaction with the hydrocarbon liquid or mixture of hydrocarbon liquids, to form the chlorinated derivatives therefrom, the particles of catalyzing materials falling back to the bottom of the container, outside of the percolator 2, and being again forced up through the percolator tube, and thus used over and over again.

The products of the reaction are hydrogen chlorid and the chlorinated derivatives of the hydrocarbon or mixture of hydrocarbons treated. Any vapors given off during the course of the reaction pass through the top of the container through pipe 15 to the reflux condenser 16 and are returned or refluxed through the pipe 20 to the container. The hydrogen chlorid passes on through the pipe 21 to a water absorber in which it is brought into contact with water to form a solution of hydrochloric acid.

It has been found in actual practice that the catalyzing material silica jel, batchite, or cocoanut charcoal is not altered during the course of the reaction, except that its efficiency as a catalyzer and chlorin carrier is increased by repeated usage, its function being purely that of a chlorin carrier and a catalyzer, which as before stated, causes the reaction to proceed more smoothly and regularly, and more quickly.

When the reaction has proceeded as far as desired, which point may be determined by drawing off portions of the hydrocarbon liquid treated, and analyzing the same, or which point may be standardized by repeated operations, the introduction of chlorin is stopped and the chlorinated products are drawn off from the container, through the pipe 13, the catalyzing material being prevented from flowing out by the screen 5. When the charge has been withdrawn the apparatus can be immediately refilled and the process of chlorination repeated.

While a type of apparatus for the purpose of treatment of hydrocarbon of the paraffin series with chlorin using silica jel, batchite, or cocoanut charcoal as a catalyzer, is shown herein, it is to be clearly understood that the invention may be carried out in other apparatus, and is not limited to the specific apparatus shown and described.

What we claim and desire to secure by Letters Patent is:—

1. The herein described method of chlorinating hydrocarbons, which consists in treating a paraffin hydrocarbon with chlorin in the liquid phase in the presence of finely divided catalyzing material, and injecting the chlorin below said finely divided catalyzing material, so as to cause said catalyzing material to percolate through said liquid.

2. The herein described method of chlorinating liquid members of the paraffin series of hydrocarbons, which consists in introducing a jet of chlorin into a body of such liquid hydrocarbon, in the presence of a granular catalyzing material and by means of said jet effecting the constant motion of granules of the catalyzing material through the liquid.

3. The herein described method of chlorinating liquid members of the paraffin series of hydrocarbons, which consists in treating a body of such hydrocarbon in the liquid phase with a jet of chlorin in the presence of an adsorbent in finely divided condition, said jet of chlorin being introduced below the adsorbent and causing the continuous circulation of the granular adsorbent in the liquid.

4. The herein described method of chlorinating liquid members of the paraffin series of hydrocarbons, which consists in treating a body of such hydrocarbon in the liquid phase with a jet of chlorin in the presence of silica jel in finely divided condition, as a catalyzing material and chlorin carrier.

5. The herein described method of chlorinating liquid members of the paraffin series of hydrocarbons, which consists in treating a body of such hydrocarbons in the liquid phase with a jet of chlorin in the presence of silica jel in finely divided condition, said chlorin being introduced in a jet below said silica jel so as to cause the continuous circulation thereof in the liquid.

6. A method of treating members of the paraffin series of hydrocarbons, with chlorin, in the liquid phase, using silica jel in the granular form and impregnated with salts of metals, as a catalyzer.

In testimony whereof we affix our signatures.

GEORGE T. KOCH.
ALBERT L. STALLKAMP.

Witnesses:
N. M. BUMBAUER,
A. A. LONG.